United States Patent [19]

Shedigian et al.

[11] Patent Number: 4,521,826

[45] Date of Patent: Jun. 4, 1985

[54] DIELECTRIC FLUID FOR A COMPACITOR

[75] Inventors: Vandos Shedigian; Gerald A. Voyles, both of Indianapolis, Ind.

[73] Assignee: Emhart Industries, Inc., Indianapolis, Ind.

[21] Appl. No.: 124,283

[22] Filed: Feb. 25, 1980

[51] Int. Cl.$^3$ .............................................. H01G 4/22
[52] U.S. Cl. .................... 361/314; 252/567; 252/578; 252/579; 361/315; 361/319; 361/323; 361/327
[58] Field of Search ...................... 252/567, 578, 579; 260/410.7; 361/314, 319, 327, 323

[56] References Cited

U.S. PATENT DOCUMENTS

| | | | |
|---|---|---|---|
| 1,952,158 | 3/1934 | Clark et al. | 361/327 X |
| 2,512,886 | 6/1950 | Clark | 252/579 |
| 2,700,022 | 1/1955 | Clayton et al. | 252/56 |
| 3,855,508 | 12/1974 | Ross et al. | 317/259 |

FOREIGN PATENT DOCUMENTS

| | | |
|---|---|---|
| 1012621 | 6/1977 | Canada . |
| 2427812 | 9/1975 | Fed. Rep. of Germany . |
| 2047398 | 3/1971 | France . |
| 1490581 | 11/1977 | United Kingdom . |

OTHER PUBLICATIONS

NL Industries, Industrial Chemicals, "Paricin 8", DS-435, N.J.

Primary Examiner—Prince E. Willis
Attorney, Agent, or Firm—Robert F. Meyer

[57] ABSTRACT

In a capacitor, a dielectric fluid including 0 to about 10 wt. % of an antioxidant, 0 to about 10 wt. % of an epoxide stabilizer, the remainder essentially a compound with more than two stearate groups. The presently preferred compound of the dielectric fluid is glyceryl tri(acetoxystearate). A primary function of the dielectric fluid is to help prevent air from contacting the capacitor body of the capacitor. The capacitor body includes as its dielectric a plastic film such as polypropylene and the above mentioned dielectric fluid. Air pockets in and around the capacitor body are impregnated with such fluid to minimize disruptive electrical or corona discharges without harmfully swelling the plastic film to thereby improve the operating efficiency of such capacitor.

8 Claims, 5 Drawing Figures

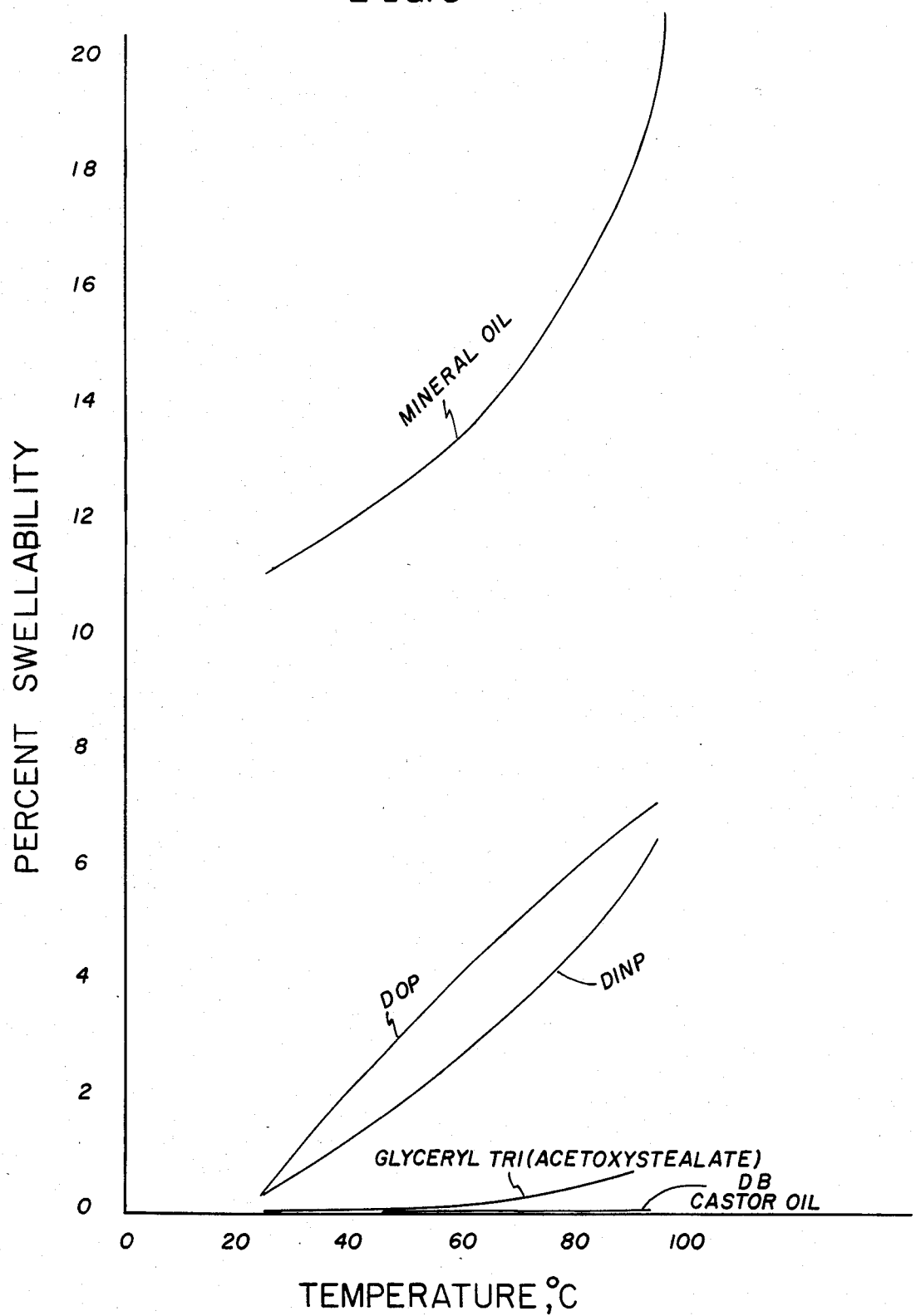

DIELECTRIC FLUID FOR A CAPACITOR

BACKGROUND OF THE INVENTION

This invention relates to metallized plastic film capacitors suitable for the application of voltages above 240 volts a-c. More particularly, this invention relates to a fluid dielectric for a-c capacitors in which the imbibition of such fluid into the dielectric plastic film of such capacitors is reduced over dielectric fluids such as mineral oil, dioctyl phthalate, diisononyl phthalate and the like.

During the manufacture of a high voltage a-c metallized film capacitor, air spaces or pockets may be formed between the surfaces of a dielectric plastic film and overlying metallized electrodes of the capacitor body as well as between the body and the inner surface of the housing for the capacitor body. Air in such pockets may include moisture. Air pockets and moisture are enemies of the plastic film and of the metallized electrodes. The presence of air pockets and moisture between the dielectric plastic film and the metallized electrodes may establish a condition where if the field strength of air or of the air-moisture combination is exceeded, disruptive electrical or corona discharges occur. Such discharges may have sufficient electrical energy associated therewith to cause erosion of the metallized film and/or gas ionization to cause harmful degradation of the plastic film. Once high energy corona discharges and gas ionization start, no material can long endure the bombardment. Harmful erosion of the metallized electrodes and/or degradation of the plastic film result in early capacitor failure.

Generally, vacuum drying is used to help eliminate moisture and to help remove air from pockets in and around the capacitor body. To help prevent air and moisture from thereafter contacting the capacitor body, high voltage metallized film capacitor manufacturers use a dielectric fluid to impregnate and surround the capacitor body. Impregnation of the capacitor body usually takes place through the limited space between the plastic film and the closely adjacent electrode. However, impregnating fluid may be imbided into the plastic film in such a way as to cause harmful swelling of the film. Harmful swelling of the film causes it to soften which may result in high energy electrical discharges which cause erosion of the electrodes and degradation of the plastic film resulting in early capacitor failure. Difficulties associated with harmful imbibition of dielectric fluids such as mineral oil, dioctyl phthalate, diisononyl phthalate and the like into a plastic film such as biaxially oriented polypropylene can be reduced by using the dielectric fluid of this invention.

FEATURE OF THE INVENTION

Therefore, a feature of this invention is to provide a dielectric fluid which causes little, if any, harmful swelling of a plastic film of a high voltage a-c capacitor. Such dielectric fluid includes a compound with more than two stearate groups such as glyceryl tri(acetoxystearate), butyl acetoxystearate, iso-octyl epoxy stearate and the like. The presence of more than two stearate groups increases the number of carbonyl groups

to at least three (3) per unit of volume of the fluid which seems to reduce harmful imbibition of such fluid into the dielectric plastic film. The dielectric fluid of this invention has a substantially decreased value of solubility into a plastic dielectric film such as biaxially oriented polypropylene than does either dioctyl phthalate (DOP), or diisononyl phthalate (DINP), or mineral oil.

SUMMARY OF THE INVENTION

Briefly, this invention, in one of its presently preferred forms, comprises a pair of electrically conductive electrodes, and a dielectric comprising a dielectric plastic film and a dielectric fluid including 0 to about 10 wt. % of an antioxidant, 0 to about 10 wt. % of an epoxide stabilizer, the remainder essentially a compound with more than two stearate groups. The presently preferred plastic film is biaxially oriented polypropylene and the presently preferred compound of the dielectric fluid is glyceryl tri(acetoxystearate).

BRIEF DESCRIPTION OF THE DRAWING

FIG. 5 is a graph illustrating the swellability of biaxially oriented polypropylene film after immersion in various dielectric fluids.

DISCUSSION OF THE INVENTION

Figure 1:
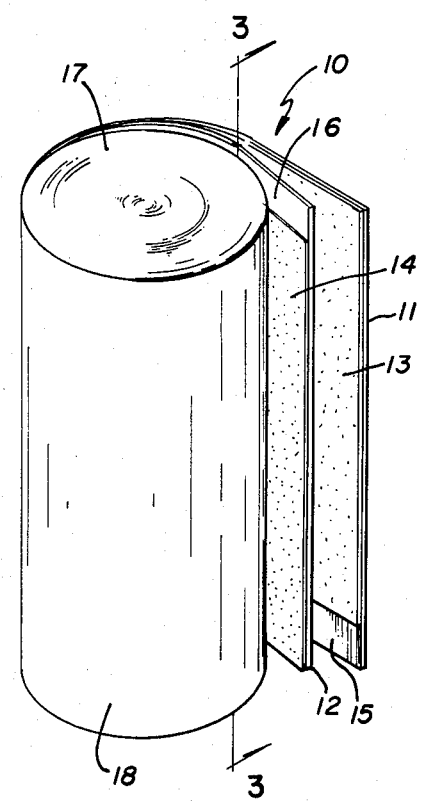
FIG. 1 of the drawing illustrates a convolutely wound a-c capacitor body partially unwound to show the dielectric plastic film and metallized foil electrode structure.

Referring now to FIG. 1 of the drawing, there is illustrated a convolutely wound a-c capacitor body 10. The capacitor body 10 includes a pair of dielectric plastic film layers 11 and 12 and overlying metallized electrodes 13 and 14 respectively. The dielectric plastic film layers 11 and 12 are metallized in such a manner as to provide margins 15 and 16 which are free of metal. Such margins are useful in helping to prevent electrical short circuit between the metallized electrodes at the ends of the capacitor body 10. In convolutely winding the capacitor body 10, the metallized electrode 13 overlying the plastic film 11 is laterally offset with respect to the metallized electrode 14 overlying the plastic film 12 so that metallized electrode 13 and margin 16 appear at end 17 of the capacitor body and so that metallized electrode 14 and margin 15 appear at end 18 of the capacitor body.

Figure 2:
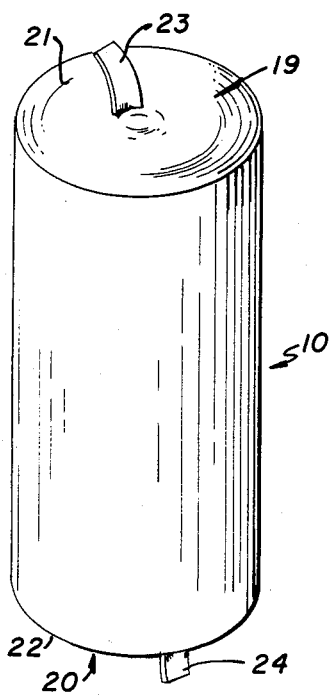
FIG. 2 of the drawing illustrates the convolutely wound a-c capacitor body of FIG. 1 to which terminal leads are attached.

As shown in FIG. 2, suitable terminal leads 19 and 20 are attached to the ends 17 and 18, respectively, of the capacitor body 10 using any suitable attachment process. The attachment process must not result in electrically conductive material penetrating into the capacitor body 10 so as to cause the metallized electrode at the capacitor body edge to electrically short the other metallized electrode. An acceptable attachment process includes spraying the ends 17 and 18 of the capacitor body 10 with lead, a lead alloy, aluminum, an aluminum alloy, zinc, a zinc alloy, tin, a tin alloy, nickel, nickel alloy and the like. The metal material at the ends of the capacitor body 10 are indicated by the reference numerals 21 and 22. Lead strips 23 and 24 are suitably attached to the metal material as shown in FIG. 2. A suitable lead strip material is solder coated copper.

Figure 3:
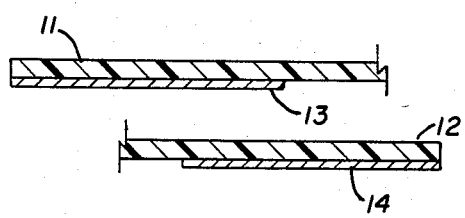
FIG. 3 is a partial sectional view taken across the lines 3—3 of the a-c capacitor body of FIG. 1.

FIG. 3 is a sectional view taken along the line of 3—3 FIG. 1 but limited to a small section of the capacitor body 10. In FIG. 3, the plastic film layers 11 and 12 and their respective overlying metallized electrodes 13 and 14 are arranged in the same manner as shown in FIG. 1.

Metallized electrode 13 is integrally joined to the plastic film 11 whereas metallized electrode 14 is integrally joined to the plastic film 12. FIG. 3 shows a metallized electrode on but one side of the plastic film; however, the metallized electrode layers may be deposited on both sides of the plastic film. FIG. 3 shows a single side of the plastic film as being metallized. The application of the metallized electrodes 13 and 14 to their respective plastic film may be accomplished by any suitable process such as vapor, chemical or other known metal deposition processes. For example, aluminum can be deposited over the dielectric layer to have a resistivity of about 1 to about 4 ohms per square. Depending on the specific operating characteristics desired, the resistivity of each metallized electrode can be more than 4 ohms per square or less than 1 ohm per square. Generally speaking, a capacitor with high resistivity metallized electrodes tends to suffer a decrease in its capacitance more readily than does a capacitor with lower resistivity electrodes. On the other hand, a capacitor with low resistivity metallized electrodes may not clear or self-heal. The low resistivity metallized electrode capacitor would tend to fail if the dielectric plastic film suffers a breakdown, since the thicker metallized layer would require more energy to produce vaporization of the electrodes around any such breakdown site. Metals other than aluminum may be used as the metallized electrodes provided they do not disintegrate dielectric plastic film and have the desired resistivity. Such other metals include nickel, zinc, tin and the like.

The dielectric plastic films or layers 11 and 12 should have high dielectric strength, low dissipation factor to prevent thermal runaway, broad temperature range capabilities, resistance to the dielectric fluid, and freedom from pinholes and conductive particles. The dielectric film layers 11 and 12 may be of any suitable homogenous polymer or plastic material such as polyester, polyethylene, polycarbonate, polystyrene, polysulfone, polyethylene terephthalate and, preferably, the polyolefins, particularly polypropylene. Polyester is not as desirable as polypropylene because in a-c capacitors it tends to generate too much heat at desired operating voltage stresses. The upper operating temperture of polyethylene is much lower than that of polypropylene. Polycarbonate, polystyrene and polysulfone are not as solvent resistant as a polypropylene.

The presently most preferred polypropylene is biaxially oriented polypropylene for it tends to meet all desirable specifications. Biaxially oriented polypropylene is preferred because it permits an a-c capacitor to operate at high KVAR (kilovolt-ampere reactive) per unit volume due to its high dielectric strength and low dissipation factor and it imbibes little, if any, of the dielectric fluid of this invention under operating conditions.

Figure 4:
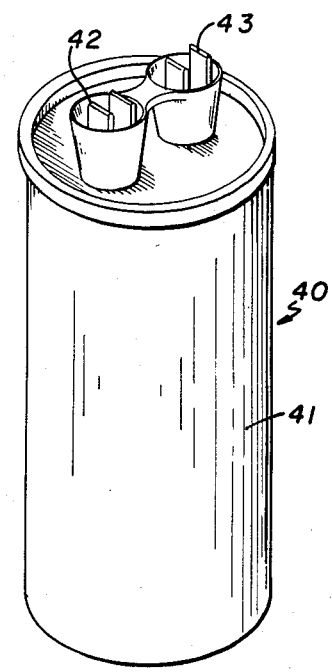
FIG. 4 of the drawing illustrates the a-c capacitor body suitably encased and sealed in a housing.

In FIG. 4, a capacitor body 10 is preferably sealed to a can or housing 40 to form a capacitor 41. Capacitor 41 includes the metal housing or can 40 and terminals 42 and 43. The capacitor body 10 is contained within the housing 40 and terminal lead 23 makes electrical contact with terminal 42 and the remaining terminal lead 24 makes electrical contact with terminal 43.

The dielectric fluid or liquid of this invention has little, if any, solubility into a plastic film such as polypropylene, has high electrical strength, is easily purifiable to achieve low conductivity or dissipation factor, maintains its good electrical properties at high operating temperatures, is not too volatile, and is reasonably biodegradable.

The dielectric fluid or liquid of this invention used as the impregnant for the capacitor body 10 includes a compound with two or more stearate groups. The stearate constituent has a structural formula:

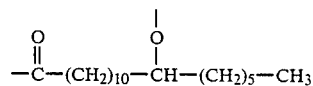

The presence of more than two stearate groups means that at least 3 carbonyl groups

per unit of fluid which seems to reduce the imbibition of such fluid into the dielectric plastic film of the capacitor body. Acetoxy,

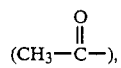

also includes a carbonyl group. The dielectric fluid of present invention has a substantially decreased value of solubility into the polyproplylene film over such dielectric fluids as DOP, DINP and mineral oil. DOP and DINP each include two (2) carbonyl groups. Mineral oil does not include a carbonyl group. The compound with more than two stearate groups comprises from about 100 to about 80 percent by weight of the total weight of the presently preferred dielectric fluid. However, small additions, that is, 1.0 percent by weight or more of the dielectric fluid of the present invention to dielectric fluids such as DOP, DINP and mineral oil will result in a dielectric fluid with decreased solubility in polypropylene film over dielectric fluids which are 100 weight percent DOP or DINP or mineral oil.

Compounds with two or more stearate groups which may be used as or part of the dielectric fluid of this invention include butyl acetoxystearate, glyceryl tri(acetoxystearate), iso-octyl epoxy stearate groups which may be used as or part of the dielectric fluid. Typical properties of the presently preferred dielectric fluid, glyceryl tri(acetoxystearate), are given in Table I.

TABLE I

| Typical Properties of Glyceryl tri(acetoxystearate) | |
|---|---|
| Specific Gravity, 25° C./25° C. | 0.955 |
| Density, 25° C., lbs/gal | 7.94 |
| Viscosity, 25° C., stokes | 4.7 |
| Pour Point, °F. | 30 |

TABLE I-continued

| Typical Properties of Glyceryl tri(acetoxystearate) | |
|---|---|
| Acid Value | 1 |
| Saponification Value | 298 |
| Volatile, 105° C., % | 0.2 |
| Dielectric Constant | 4 at 100 Hz and 25° C. |
| | 3.5 at 100 Hz and 100° C. |
| Dissipation Factor | 0.1 at 100 Hz and 100° C. |
| Index of Refraction | 1.46 at 25° C. |
| Molecular Weight | 1058 |

FIG. 5 of the drawing illustrates the swellability of biaxially oriented polyproplene film after immersion in mineral oil, DOP, DINP, DB castor oil and glyceryl tri(acetoxystearate). As shown in FIG. 5, the most swelling experienced by the biaxially oriented polypropylene film occurs in mineral oil, and the least in DB castor oil (tri-glyceride of ricinoleic acid with a hydroxyl group) and glyceryl tri(acetoxystearate). Swelling of biaxially oriented polypropylene film in DOP and DINP is greater than swelling of such polyproylene in glyceryl tri(acetoxystearate). It is known that DB castor oil is highly hydroscopic due to the presence of a hydroxyl group. Under operating temperatures and voltage stresses, DB castor oil will, in the presence of water, dissociate acid which will degrade polypropylene film. The presence of acid in the capacitor body might cause a drop in capacitance of the capacitor even if there is no swelling experienced by the polypropylene film. Glyceryl tri(acetoxystearate) does not include a hydroxyl group as does CB castor oil and has a negligible swelling affect on the polypropylene film when compared to the other dielectric fluids such as mineral oil, DOP and DINP.

In addition to the compound with more than two stearate groups of this invention, the dielectric fluid composition may contain minor amounts of numerous other components. In particular, it is often desirable to include components which act as a stabilizing agent and as an antioxidant in the dielectric system of the capacitor.

Stabilizing agents seem to maintain a low power factor in the dielectric system which may be due to their property of absorbing ions. Examples of stabilizing agent are epoxides such as 1-epoxyethyl-3,4-epoxycyclohexane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, and the like. These stabilizing agents may be used in the dielectric fluid composition of this invention in amounts in the general range of from 0 to about 10 percent by weight of the total weight of the dielectric fluid and, preferably, from about 0.001 to about 10 percent by weight of the total weight of the dielectric fluid. Other stabilizing agents known to the art which do not significantly increase the dissipation factor of the dielectric may also be used. Mixtures of stabilizing agents are also contemplated.

In addition to the stabilizing agent or agents, it may be desirable to include a component to act as an antioxidant. The antioxidant may help to keep the dissipation factor lower for a longer period of time. The preferred amount of antioxidant is 0 to about 10 weight percent of the total weight of the dielectric fluid, and preferably, about 0.01 to about 10 weight percent of the total weight of the dielectric fluid. The antioxidant may include phenols such as phenolic and di-tert-butyl-p-cresol. Other antioxidants known to the art which do not significantly increase the dissipation factor of the dielectric fluid may also be used. Mixtures of antioxidants are also contemplated.

The following example further illustrates the dielectric fluid of the present invention. Several capacitors are fabricated as hereinafter described. The capacitor body section is that as described in FIG. 1 with biaxially oriented polypropylene film strips about 55 millimeters wide and about 8 microns thick. Each polypropylene strip is metallized with aluminum. The resistivity of the aluminum is about 2 to about 4 ohms per square. Four (4) capacitors are placed in a housing and the housing is then filled with a dielectric fluid so that the capacitor body of the capacitor is submerged in the dielectric fluid or liquid. The percentage of decrease in capacitance during accelerated life testing of each such capacitor is shown in Table II and III. The tests are conducted at a temperature of about 80° and about 460 volts a-c or 57.5 volts per micron.

TABLE II

| Fluid | Life Hours | % Capacitance Loss |
|---|---|---|
| DOP | 2000* | 5.30 |
| DINP | 2000* | 4.65 |
| DB Castor Oil | 2000 | 3.80 |
| Glyceryl tri(acetoxy-stearate) | 2000 | 2.05 |

*Test ended after 2000 hours

TABLE III

| DB Castor Oil | 4000 | 4.45 |
|---|---|---|
| Glyceryl tri(acetoxy-stearate) | 4000 | 2.40 |

The above Tables show that accelerated life tests of the capacitors impreganted with glyceryl tri(acetoxystearate) have the lowest percent capacitance loss and compare favorably with DB castor oil after 4000 hours of life testing. The electrochemical stability of the glyceryl tri(acetoxystearate) appears to be quite high. The uniformity and integrity of the new dielectric fluid appears to contribute to its low percentage capacitance loss.

The dielectric system of the present invention is particularly applicable to the "self-healing type" a-c capacitor. The self-healing of a capacitor is a phenomenon in which, when a voltage stress is applied between the electrodes of a capacitor, an electrical weak point of a dielectric is broken down and electrical energy is discharged therethrough. Under such an operating condition, part of the metal of the metallized electrodes is vaporized and the dielectric between the electrodes is recovered. The glyceryl tri(acetoxystearate) has a structural formula:

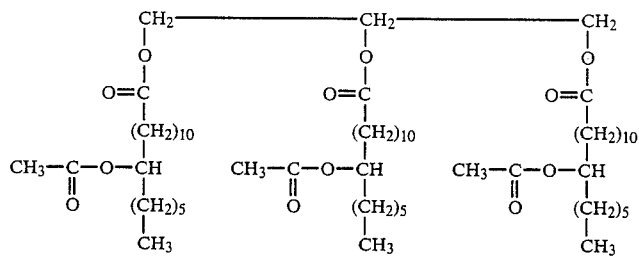

We claim:

1. In a capacitor, a dielectric fluid including 0 to about 10 wt. % of an anti-oxidant or mixtures of antioxidant, 0 to about 10 wt. % of an epoxide stabilizer or mixtures of epoxide stabilizers, the remainder essentially glyceryl tri(acetoxystearate).

2. In the capacitor of claim 1, wherein the fluid includes about 0.01 to about 10 wt. % of a phenolic antioxidant, about 0.001 to about 10 wt. % of an epoxide stabilizer, the remainder essentially glyceryl tri(acetoxystearate).

3. A capacitor comprising a pair of electrically conductive electrodes and a dielectric separating the electrodes, the dielectric including a plastic film and the dielectric fluid of claim 1.

4. The capacitor of claim 3, wherein the plastic film is selected from the group consisting of polypropylene, polyester, polycarbonate, polystyrene, polysulfone and polyethylene terephthalate, and the dielectric is glyceryl tri(acetoxystearate).

5. The capacitor of claim 3, wherein the plastic film is biaxially oriented polypropylene and the dielectric is glyceryl tri(acetoxystearate).

6. The capacitor of claim 3, wherein the plastic film consists essentially of biaxially oriented polypropylene and the fluid consists essentially of about 0.01 to about 10 wt. % of a phenolic antioxidant, about 0.001 to about 10 wt. % of an epoxide stabilizer, the remainder essentially glyceryl tri(acetoxystearate).

7. A convolutely wound a-c capacitor comprising a pair of metallized electrically conductive electrodes and a dielectric system separating the electrodes, the dielectric system including biaxially oriented polypropylene film and glyceryl tri(acetoxystearate).

8. The capacitor of claim 7, wherein the dielectric system thereof also includes one or more of an epoxide stabilizing agent, an antioxidant, DB castor oil, mineral oil, dioctyl phthalate and diisononyl phthalate.

* * * * *